(12) United States Patent
Dickinger et al.

(10) Patent No.: US 8,690,439 B2
(45) Date of Patent: Apr. 8, 2014

(54) BEARING COVER

(75) Inventors: Karl Dickinger, Vorchdorf (AT);
Herbert Schmid, Vorchdorf (AT);
Alexander Mueller, Altmuenster (AT)

(73) Assignee: Miba Sinter Austria GmbH,
Laakirchen (AT)

( * ) Notice: Subject to any disclaimer, the term of this patent is extended or adjusted under 35 U.S.C. 154(b) by 545 days.

(21) Appl. No.: 12/737,898

(22) PCT Filed: Aug. 22, 2009

(86) PCT No.: PCT/AT2009/000322
§ 371 (c)(1),
(2), (4) Date: Feb. 28, 2011

(87) PCT Pub. No.: WO2010/022420
PCT Pub. Date: Mar. 4, 2010

(65) Prior Publication Data
US 2011/0158569 A1 Jun. 30, 2011

(30) Foreign Application Priority Data
Sep. 1, 2008 (AT) .................................. 1355/2008

(51) Int. Cl.
*F16C 9/02* (2006.01)
(52) U.S. Cl.
USPC ........................................................ 384/432
(58) Field of Classification Search
USPC .......................................... 384/294, 432–434
See application file for complete search history.

(56) References Cited

U.S. PATENT DOCUMENTS

| 2,729,521 | A | * | 1/1956 | Maybach et al. | 384/294 |
| 4,093,322 | A | * | 6/1978 | Koskuba | 384/432 |
| 5,905,939 | A | | 5/1999 | Ishijima et al. | |
| 6,017,151 | A | | 1/2000 | Heinemann | |
| 6,086,258 | A | * | 7/2000 | Cadle et al. | 384/294 |
| 6,431,759 | B1 | | 8/2002 | Luchner et al. | |
| 6,435,723 | B1 | | 8/2002 | Wolf et al. | |
| 6,471,406 | B1 | | 10/2002 | Cadle et al. | |

FOREIGN PATENT DOCUMENTS

| DE | 198 19 080 | 11/1999 |
| DE | 199 07 661 | 8/2000 |
| DE | 10 2004 026 297 | 9/2005 |
| EP | 0 815 996 | 1/1998 |
| EP | 0 882 901 | 12/1998 |
| EP | 1 075 605 | 2/2001 |
| JP | 06-042526 | 2/1994 |

OTHER PUBLICATIONS

International Search Report.

* cited by examiner

*Primary Examiner* — Thomas R Hannon
(74) *Attorney, Agent, or Firm* — Collard & Roe, P.C.

(57) ABSTRACT

The invention relates to a bearing cover (3) for a split bearing arrangement (1) which, in addition to the bearing cover (3), comprises a bearing block (2), and the bearing cover (3) has a clamping surface (5) which lies against a co-operating clamping surface (6) of the bearing block (2) when the bearing arrangement (1) is in the assembled state, and at least one projection (7) is provided on the clamping surface (5) and protruding out from it which can be pushed into the co-operating clamping surface (6) of the bearing block (2). The at least one projection (7) has a cross-section (9) which varies across its extension on the clamping surface (5) and/or is of a conical or frustoconical or pyramid or truncated pyramid shape.

10 Claims, 4 Drawing Sheets

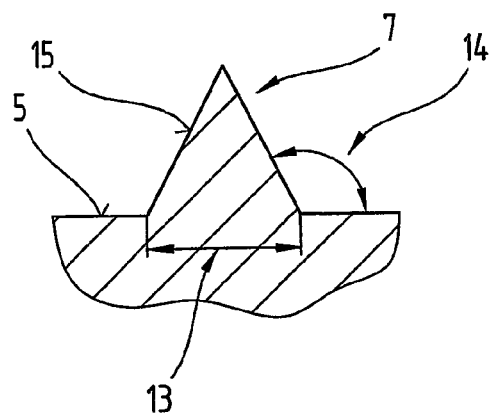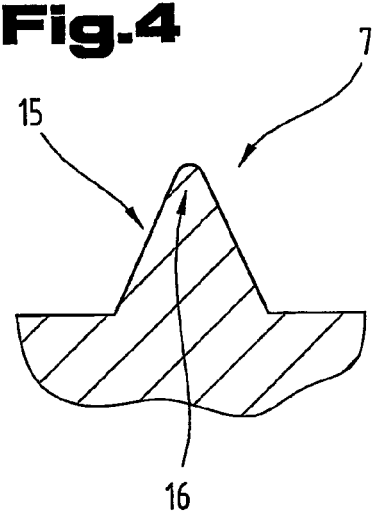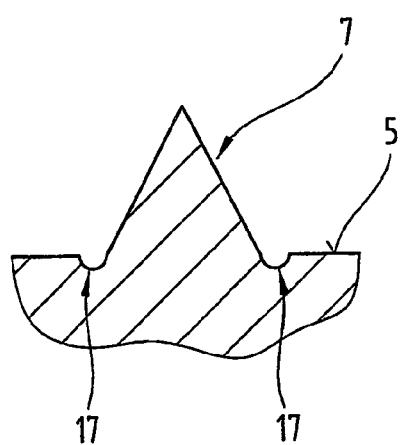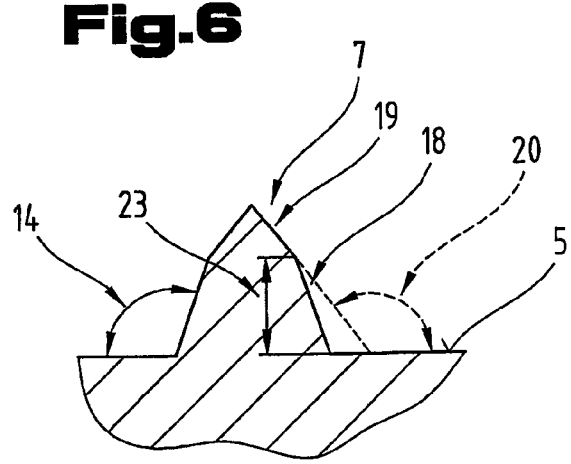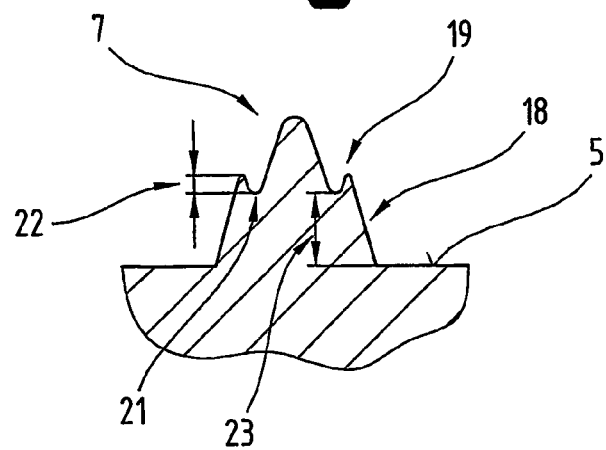

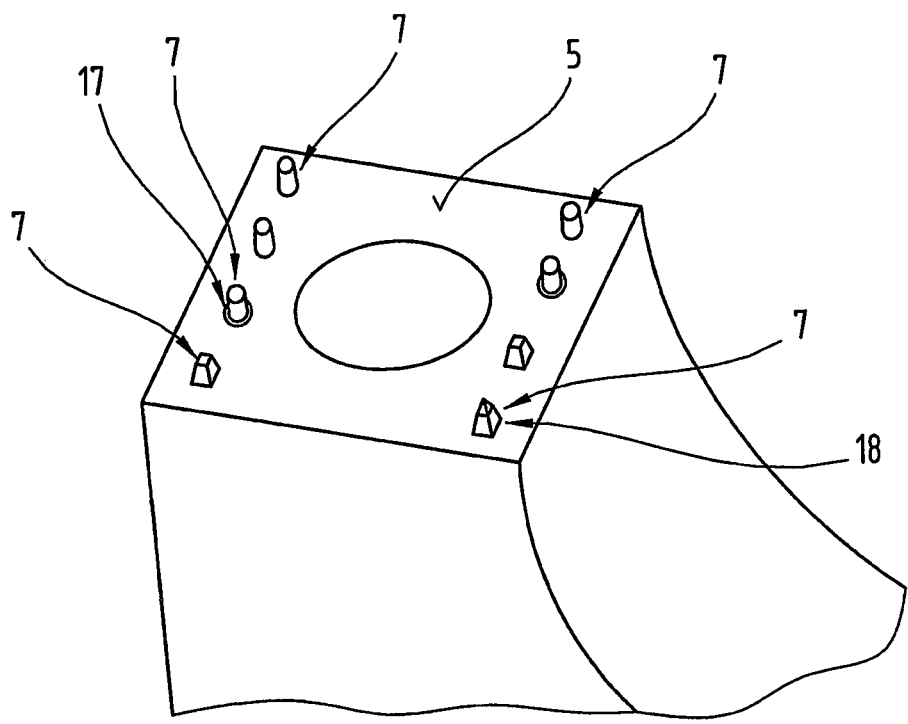

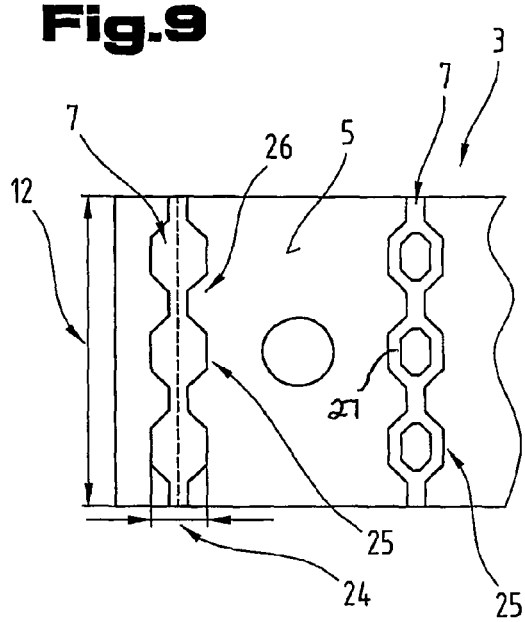
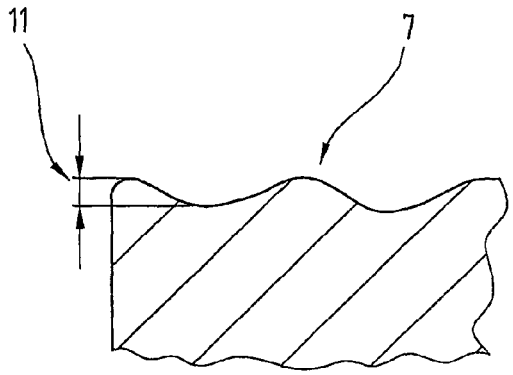
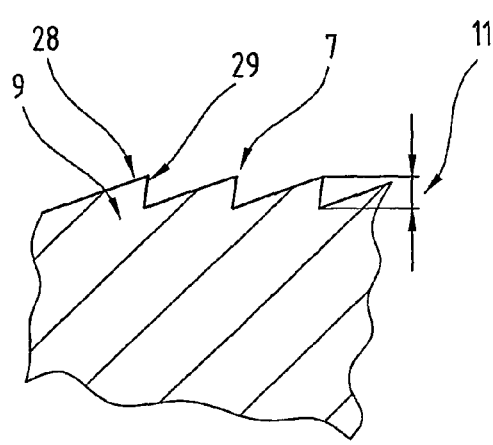
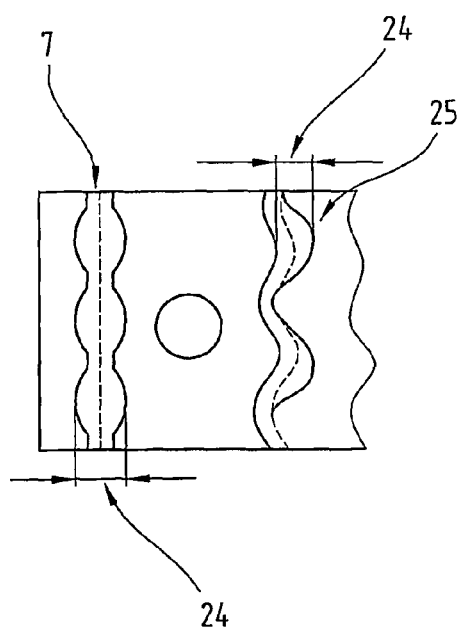
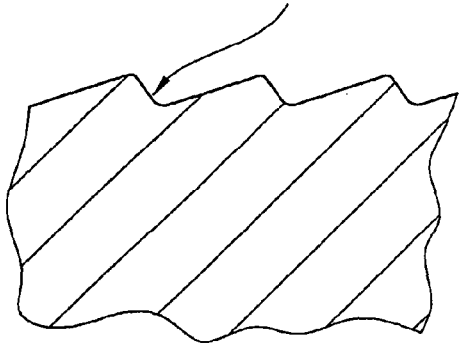

BEARING COVER

CROSS REFERENCE TO RELATED APPLICATIONS

This application is the National Stage of PCT/AT2009/000322 filed on Aug. 22, 2009, which claims priority under 35 U.S.C. §119 of Austrian Application No. A 1355/2008 filed on Sep. 1, 2008, the disclosure of which is incorporated by reference. The international application under PCT article 21(2) was not published in English.

The invention relates to a bearing cover for a split bearing arrangement, comprising a bearing block in addition to the bearing cover, and the bearing cover has a clamping surface which lies against a co-operating clamping surface of the bearing block when the bearing arrangement is in the assembled state, and at least one projection is provided on the clamping surface and protruding out from it, which can be pushed into the co-operating clamping surface of the bearing block, as well as a corresponding bearing arrangement with a bearing cover and a bearing block lying against it.

Patent specification EP 1 075 605 B1 discloses a split bearing arrangement in a housing, in particular crankshaft sliding bearings for reciprocating piston machines, comprising a bearing block and a bearing cover made from materials with differing hardness, and the bearing cover made from a ferrous material which can be clamped onto the bearing block has sharp-edged, pointed projections protruding from its clamping surface which can be pushed into the co-operating clamping surface of the bearing block made from lightweight metal by applying force when the bearing cover is initially assembled, and grooves are also provided in the clamping surface of the bearing cover. The projections are based on a cutting profile or pyramid-shaped design and the projections have a cutting angle of 50° to 110°. The cutting height above the clamping surface of the bearing cover is between 0.25 mm and 1.5 mm. The grooves adjoin the cutting flanks of the projections and are recessed into the clamping surface, and these grooves are rounded with a radius of 0.15 mm to 0.30 mm. These grooves are used to accommodate the material of the bearing block which is forced there as the projections are pushed into the bearing block.

The objective of this invention is to propose a bearing cover and a split bearing arrangement, by means of which or with which the bearing cover can be more effectively affixed to the bearing block.

This objective of the invention is achieved on the basis of the bearing cover specified above, due to the fact that the at least one projection has a cross-section which varies across its extension on the clamping surface and/or due to the fact that the least one projection is of a conical or frustoconical or pyramid or truncated pyramid shape.

The advantage of this is that the accuracy of the seat of the bearing cover on the bearing block can be improved. This not only results in the advantage known from the prior art whereby higher transverse forces can be absorbed, it also enables longitudinal forces extending in the axial direction of the bearing to be more effectively absorbed, thereby enabling forces acting on the bearing arrangement to be better controlled. The projection is of a conical or frustoconical or pyramid or truncated pyramid shape and, in this respect, there are preferably several of these projections distributed across the clamping surface. Accordingly, the bearing cover proposed by the invention also enables a positive fit to be obtained in the axial direction of the bearing arrangement. Furthermore, this ensures that the bearing cover can be assembled with the bearing block in the right direction. The projections, which have a varying cross-section, also make for better centring, thereby preventing any tilting of the bearing cover when the bearing arrangement is being assembled.

For reasons relating to production, it is preferable if the projection has a varying width and/or height across its length and if, as is the case with one variant of this embodiment, the projection has a tapering cross-section in the direction of a width of the clamping surface.

Based on one embodiment of the invention, at least two projections are provided on each clamping surface, and the cross-sectional tapers extend in opposite directions and in particular are complementary, the advantage of which is that the direction in which the longitudinal forces are absorbed if providing only tapering projections is no longer of any relevance, as may be the case with the most basic embodiment of the invention under certain circumstances.

The projections may have a triangular cross-section, thereby improving the clamping action during assembly with the bearing block, in other words when pushing the projections into the material of the bearing block, which also enables better control of the forces to be obtained.

In this respect, it is also possible for the projections to be of an at least partially rounded design in order to make it easier to fix the bearing cover on the bearing block.

In order to improve this effect, the rounded region may have a radius selected from a range with a lower limit of 0.01 mm and an upper limit of 10 mm. Especially if the tip of the projection is provided with the rounded region, it will be possible to compact or calibrate this region to a greater degree during production of the bearing cover using sintering technology, so that greater mechanical strength can be imparted to this region which is pressed into the co-operating clamping surface of the bearing block.

In this respect, it is also possible for the rounded region to have a radius selected from a range with a lower limit of 0.02 mm and an upper limit of 4 mm, preferably a lower limit of 0.1 mm and an upper limit of 2 mm.

In order to improve the way the projections of the bearing cover are pushed into the co-operating clamping surface of the bearing block, at least one side face of the projection or projections extending in the direction of the width of the clamping surface has an angle of inclination towards the clamping surface which is selected from a range with a lower limit of 90° and an upper limit of 160°.

In order to improve this effect, it is of advantage if this angle of inclination is selected from a range with a lower limit of 100° and an upper limit of 145°, in particular from a range with a lower limit of 115° and an upper limit of 130°.

Another option is for the projection or projections to be provided with an offset in the region of at least one of two side flanks so that the material can be forced more readily into the co-operating clamping surface of the bearing block.

By offset within the meaning of the invention is meant a discontinuity in the profile cross-section, for example a change in the angle of inclination of the surface with respect to the horizontal.

Based on yet another embodiment and with a view to improving this effect still further, the offset forms a cut-out or recess in the side flank, which is able to accommodate at least some of the forced material of the co-operating clamping surface. A profile akin to a "mountain range" is created as a result, which also enables improved clamping of the bearing cover with the bearing block and can thus be used to absorb higher forces, in particular transverse forces and longitudinal forces.

To provide a clearer understanding, the invention will be described in more detail below with reference to the appended drawings.

These are schematically simplified diagrams illustrating the following:

FIG. 3 shows a projection in cross-section;

FIG. 4 illustrates a different embodiment of a projection in cross-section;

FIG. 5 illustrates another embodiment of a projection in cross-section;

FIG. 6 shows an embodiment of a projection in cross-section;

FIG. 7 shows an embodiment of a projection in cross-section;

FIG. 8 is a view at an angle showing a detail from a bearing cover in the region of the clamping surface with different embodiments of projections;

FIG. 9 is a plan view showing a detail of a bearing cover with projections with a varying width;

FIG. 10 is a side view in section showing a detail of a bearing cover with a projection based on a saw tooth shape;

FIG. 11 is a side view in section showing a detail of a bearing cover with a different design of projections with a saw tooth shape;

FIG. 12 is a side view in section showing a detail of a bearing cover with a wave-shaped projection as viewed in cross-section;

FIG. 13 is a plan view showing a detail of a bearing cover with projections with a varying width.

Figure 1:
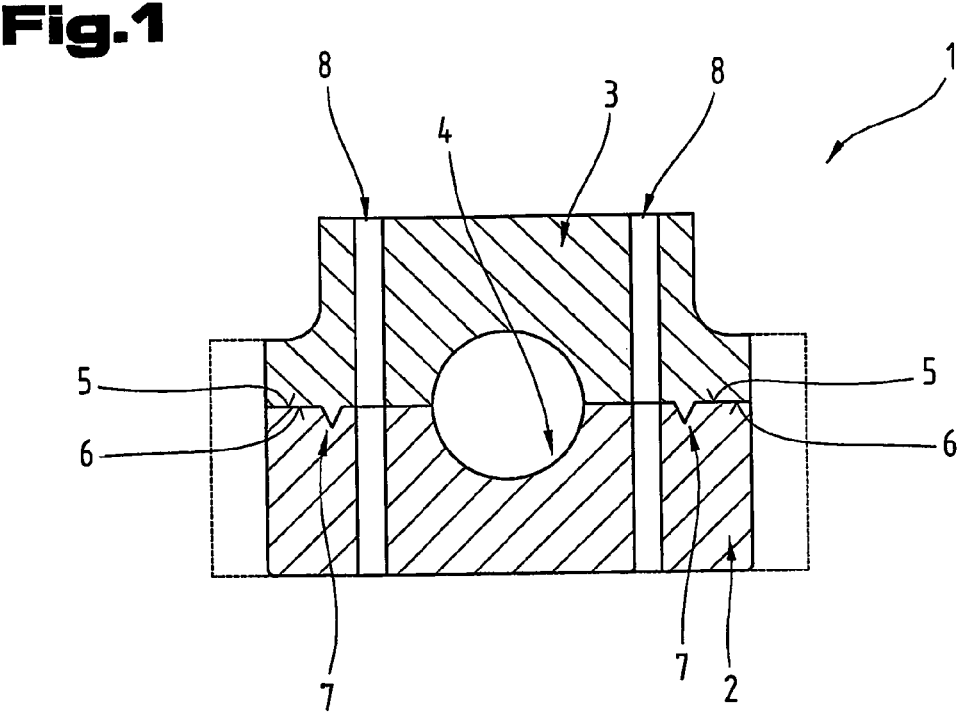
FIG. 1 shows a cross-section through a split bearing arrangement.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIG. 1 illustrates a split bearing arrangement 1 such as might be used in an engine housing of a reciprocating piston engine, for example. This bearing arrangement 1 comprises a bearing block 2 and a bearing cover 3, which together form a friction bearing 4 for a crankshaft, for example. The bearing cover 3 has a clamping surface 5 at each of its two distal end regions and the bearing block 2 has co-operating clamping surfaces 6 at each of its two end regions lying opposite the clamping surfaces 5. Protruding out from the clamping surfaces 5 is at least one projection 7 per clamping surface 5, which is pressed into the co-operating clamping surface 6 of the bearing block 2 when the bearing arrangement is in the assembled state by clamping the bearing block 2 and bearing cover 3. In order to clamp the bearing block 2 to the bearing cover 3, an end-to-end bore 8 is provided in each of the distal end regions. Seated in this bore 8 is a bolt, although this is not illustrated, which is used in conjunction with nuts to produce the clamping action. Alternatively, this bore 8 in the bearing block 2 or in the bearing cover 3 might not be based on a continuous design and instead might be a blind bore with an internal thread.

Another option, indicated by broken lines in FIG. 1, is for the distal end regions of the bearing cover 3 to be designed so that they extend in the direction towards the bearing block 2 and extend round it at the side.

The projections 7 in the embodiment illustrated here are disposed on the clamping surface 5 on the side of the bores 8 facing away from the friction bearing 4 but could optionally or in addition also be disposed on the side of the bore 8 facing the friction bearing 4.

At least the projections 7 are made from a material that is harder than the material of the bearing block 2 in the region of the co-operating clamping surface 6 so that these projections 7 can be pushed into the co-operating clamping surface 6 by pushing together and clamping the bearing block 2 and bearing cover 3. However, it is preferable if the entire bearing cover 3 is made from this harder material. For example, the bearing cover 3 may be made from a ferrous material and the bearing block 2 from a lightweight metal. In particular, the bearing cover 3 is made from a sintered material.

The friction bearing 4 may be produced by directly coating the corresponding surfaces of the bearing block 2 and bearing cover 3 and it would also be possible to use friction bearing half-shells of a type known per se.

Figure 2:
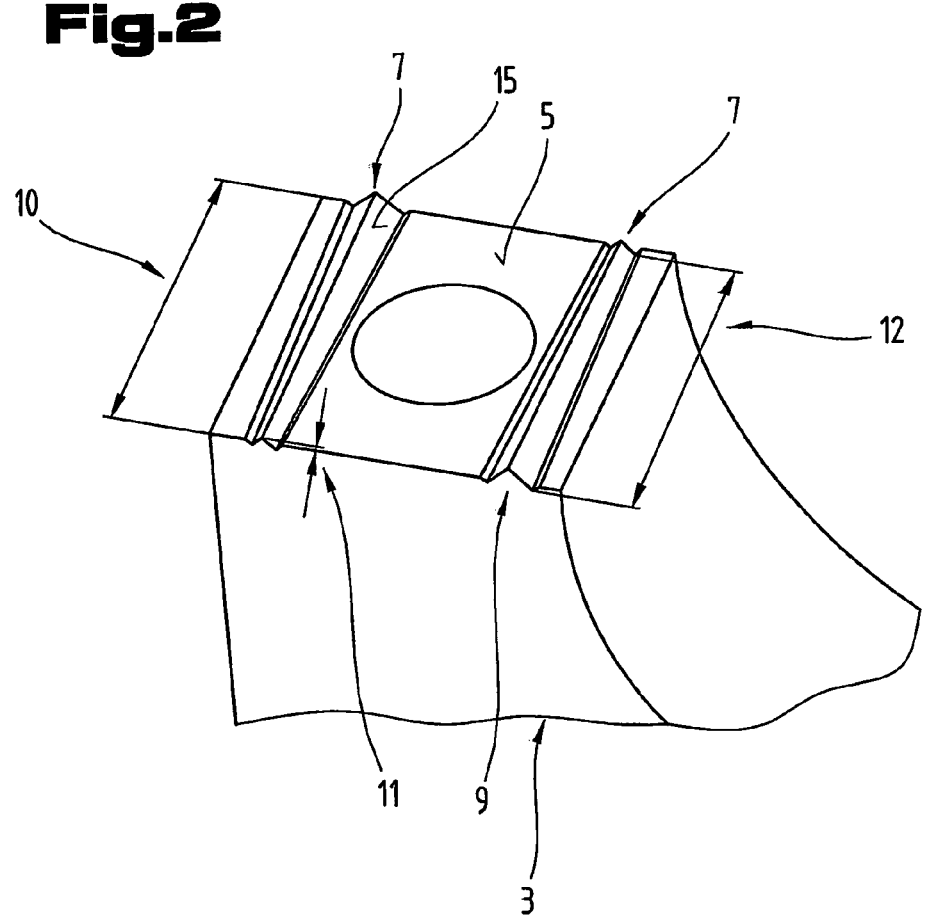
FIG. 2 shows a detail of a bearing cover in the region of the clamping surface.

As may be seen more clearly from FIG. 2, which shows the bearing cover 3 in the region of the clamping surface 5 and also represents an embodiment in which two projections 7 are provided on each clamping surface 5, the projections 7 are designed so that a cross-section 9 in the direction of a width 10 of the clamping surface 5 extending in the axial direction of the bearing arrangement 1 (FIG. 1) is of a tapering design, in other words the cross-sectional surface of the projection 7 becomes smaller from one end in the direction of towards the other end of the projection 7 across its longitudinal extension in the direction of the width 10.

In the case of the embodiment illustrated in FIG. 1, the two projections 7 may taper towards the two clamping surfaces 5 by reference to their cross-section 9, in other words, the cross-sectional surface tapers in the opposite direction from the embodiment illustrated in FIG. 2 for the clamping surface 5. It is likewise possible for this cross-sectional tapering to be identically oriented across the width 10 of the two clamping surfaces 5 for the two projections 7.

At this stage, it should also be pointed out that it, as illustrated in the case of the embodiment shown in FIG. 2, it would also be possible for a height 11 to become shorter across a length 12 of the projections 7 in the direction of the width 10 of the clamping surface 5. This therefore offers an option whereby a base width 13 (FIG. 3) of the projections 7 becomes smaller across the length 12 on the one hand. On the other hand, it is also possible for an angle of inclination 14 (FIG. 3) by which a side face 15 is inclined towards the clamping surface 5 becomes larger across the length 12 of the projections 7. It would naturally also be possible to opt for other variants of these, for example a varying base width 13 and a varying angle of inclination 14 or a varying base width 13 and a varying height 11 or a varying angle of inclination 14 and a varying height 11 or a varying base width 13, a varying height 11 and a varying angle of inclination 14 across the length 12 of the projections 7.

Furthermore, it should also be pointed out that although only one projection 7 per clamping surface 5 is illustrated in FIG. 1 and two projections 7 per clamping surface 5 are illustrated in FIG. 2, it would also be possible to provide more than two of these projections 7 on each clamping surface 5 of the bearing cover 3, for example two projections 7 lying immediately adjacent to one another, in which case 3, 4, 5, 6 or more such projections 7 may be provided on the clamping surface 5 of the bearing cover 3.

These projections 7 varying in their cross-section 9 across the length 12 result in a better positive connection between the bearing block 2 and bearing cover 3 and not only transverse loads but also longitudinal loads acting on the bearing arrangement 1 in the axial direction can therefore be better absorbed.

The angle of inclination 14 by which the side face 15 is inclined towards the clamping surface 5 may have a value selected from a range with a lower limit of 90° and an upper limit of 160°.

The change in the angle of inclination 14 across the length 12 may be selected from a range with a lower limit of 5° per 1 cm and an upper limit of 120° per 1 cm, for example.

The height 11 may have a maximum value of 4 mm.

The change in this height 11 across the length 12 of the projections 7 may be selected from a range with a lower limit of 0 mm per 1 cm and an upper limit of 4 mm per 1 cm, for example, or from a range with a lower limit of 1 mm per 1 cm and an upper limit of 3 mm per 1 cm.

The base width 13 may have a maximum value of 10 mm.

The change in this base width 13 across the length 12 of the projections 7 may be selected from a range with a lower limit of 0 mm per 1 cm and an upper limit of 10 mm per 1 cm, for example, or from a range with a lower limit of 1 mm per 1 cm and an upper limit of 8 mm per 1 cm, or from a range with a lower limit of 2 mm per 1 cm and an upper limit of 5 mm per 1 cm.

In addition to the cutter-type shape or triangular cross-sectional shape of the projections 7 illustrated in FIGS. 1 to 3, it would also be possible within the scope of the invention for at least the apex of this triangular shape to be provided with a rounded design, as may be seen in FIG. 4. A radius 16 of this rounded region may be selected from a range with a lower limit of 0.01 mm and an upper limit of 4 mm. Another option is for this radius 16 of the rounded region of the projections 7 to vary across the length 12 (FIG. 2), for example to become larger or smaller. The change in the radius 16 across the length 12 of the projections 7 may fluctuate within the specified range, for example the change in radius 16 across the length 12 may be selected from a range with a lower limit of 0.02 mm per 1 cm and an upper limit of 3 mm per 1 cm.

At this stage, it should be pointed out that the changes in the dimensions of the projections 7 mentioned in connection with the embodiments of the invention described above preferably extend continuously. Within the scope of the invention, however, it would also be possible for these changes to be based on a discontinuous or periodic or a-periodic design.

At least one of the side faces 15 of the projections 7, for example the outer one or the inner one facing and closer to the friction bearing 4, or both, may be provided with a camber, in which case a camber radius may be selected from a range with a lower limit of b/2, i.e. half the width of the surface provided with the camber, and an upper limit of 4 m.

As may be seen from FIG. 5 and as is the case with the prior art described above, the bearing cover 1 (FIG. 1) proposed by the invention may be provided, in addition to the projections 7, with groove-shaped cut-outs 17 in the clamping surface 5 adjoining the latter so that at least some of the material forced into these cut-outs 7 during assembly of the bearing cover 3 with the bearing block 2 (FIG. 1) can be accommodated there. The cross-section of these cut-outs 17 need not necessarily be rounded and it would also be possible to provide triangular, square or rectangular or trapezoid-shaped grooves as cut-outs 17, in which case corner regions of these cut-outs may be provided with rounded regions.

As illustrated in FIG. 6, the elongate projections 7 may also be provided with an offset 19 in the region of side flanks 18. This offset 19 may be designed so that the angle of inclination 14 by which the side flank 18 is inclined towards the clamping surface 5 changes in the region of the offset 19, in other words becomes larger, as a result of which the projection 7—from a geometric point of view—viewed in cross-section 9 comprises an at least partially symmetrical trapezium extending from the clamping surface 5 in the direction towards the co-operating clamping surface 6 (FIG. 1) and a triangle extending out from it. This also helps to improve the forcing of the material during assembly and the process of pushing the projections 7 into the co-operating clamping surface 6 of the bearing block 2 (FIG. 1). An additionally created angle of inclination 20 may be selected from a range with a lower limit of 90° and an upper limit of 170°.

One embodiment in this respect, illustrated in FIG. 6, may be such that the bottom region of the projection 7 has a bigger angle of inclination 14 and the top region, i.e. the offset 19, has a smaller angle of inclination 20 than it so that the bottom region is of a flatter design and the top region is of a steeper design.

As illustrated in FIG. 7, it is also possible within the scope of the invention for this offset 19 of the projection 7 to be big enough for this offset 19 to form a cut-out 21 or recess in the side flank 18, resulting in a cross-section of the projection 7 akin to a "mountain range". A depth 22 of the cut-out 21 may be selected from a range with a lower limit of 0.01 mm and an upper limit of 2 mm. This depth 21 is measured perpendicular to the clamping surface 5.

A height 23 of the offset 19 across the clamping surface 5 may be selected from a range with a lower limit of 0.01 mm and an upper limit of 0.3 mm, for example a range with a lower limit of 0.1 mm and an upper limit of 2 mm.

If offsets 19 are provided on both side flanks 18, they may lie at different heights 23, for example the outer one may be higher than the inner offset 19 facing and lying closer to the friction bearing 4.

FIG. 8 illustrates an embodiment of the invention in which the projections 7 are not of an elongate design as illustrated in FIG. 2 for example, and instead discrete projections 7 are provided. These projections 7 may be of a conical or frusto-conical shape for example or alternatively, as illustrated in the bottom part of the clamping surface 5 in FIG. 8, in the shape of a pyramid or truncated pyramid. Several of these projections 7 may be distributed across the clamping surface 5. In the case of pyramid-shaped projections 7, it is also possible for them to be provided with the offset 19 as illustrated in F*ig*. 6, in which case the side faces of the apex of the pyramids have a bigger angle of inclination with respect to the clamping surface 5 than the side faces of the truncated pyramid.

Also with this embodiment, cut-outs 17 may be provided in the clamping surface 5 extending around the projections 7 in order to accommodate material forced there by these projections 7 as the projections 7 are pushed into the co-operating clamping surface 6 of the bearing block 2 (FIG. 1).

Again with this variant of the invention, it would naturally also be possible to provide the cutouts 21 in the side faces of the projections 7 (FIG. 7). It is not absolutely necessary for several different discrete projections 7 to be provided as illustrated in FIG. 8 and this is merely intended to provide a clearer illustration of the invention.

FIG. 9 is a plan view illustrating a detail of the bearing cover 3 in the region of the clamping surface 5. Several different embodiments of the projections 7 are illustrated.

In the left-hand part of FIG. 9, a projection 7 is illustrated which has a periodically varying width 24 across the length 12. Accordingly, there are wider regions 25 and web-type regions 26 disposed in an alternating sequence. As indicated by broken lines, this projection 7 may also be akin to a cutter, optionally provided with a rounded region.

This sequence may also be different from that illustrated by way of example in the diagram of FIG. 9 in terms of the width 24 of tapering regions 25, 26 without departing from the scope of the invention, for example may be a-periodic. Furthermore, the length of the regions 25, 26 may be different from that illustrated in the direction of the length 12 of the projection 7. It would also be possible to opt for several stages with respect to the width 24. As seen in plan view, it would also be possible to provide conical transitions between the regions with a cone angle different from the one illustrated.

In the right-hand part of FIG. 9, the illustrated projection 7 may have a plateau 27 in the wider regions 25, in other words extend in a flat arrangement. Instead of the plateaus 27, however, it would also be, possible to provide an at least approximately pyramid-shaped structure in this region.

FIG. 10 illustrates another embodiment of the cross-section 9, i.e. the cross-sectional change in the projection 7. In this instance, as viewed in cross-section 9 from the side, it is designed with a varying height 11 with a saw tooth shape, comprising a rising first flank 28 and, adjoining, it a second flank 29 dropping in an at least approximately perpendicular arrangement. The second flank 29 may also be inclined in the direction towards the first flank 28, forming a sort of back-cut.

It is also possible for at least individual ones of the teeth to be of different heights 11. A web may also be provided between the teeth, extending parallel with the clamping surface 5 (e.g. FIG. 1) and the teeth may be spaced apart from one another, in other words disposed in a discrete arrangement. In this embodiment, the side faces may also be inclined towards the clamping surface 5, as explained above.

In addition to the above, FIG. 11 illustrates an embodiment of the teeth where the flanks 29 are not perpendicular but are disposed at a different angle to the clamping surface 5 (FIG. 1).

The purpose of FIG. 12 is to illustrate the fact that the change in height 11 of the projection 7 may also be based on a wave-shaped design, although the invention is not restricted to the wave shape specifically illustrated, and in particular the height 11 may also vary discontinuously or a—-periodically across the length 12 (FIG. 2) of the projection 7.

The purpose of FIG. 13, finally, is to illustrate the fact that the projection 7 may also have a wave-shaped variation in terms of its width 24, and again, as indicated by broken lines in the left-hand part of FIG. 13, may be designed as a cutter-type shape, optionally with a rounded tip.

As illustrated in the left-hand part of FIG. 13, this wave shape may be provided with a mirror plane or, as illustrated in the right-hand part of FIG. 13, may be in the shape of a snake, and yet again, some regions 25 may also be provided with a bigger width 24.

It should be pointed out that it would naturally also be possible to provide several projections 7 of different geometric shapes on a clamping surface 5, for example the elongate, in particular cutter-shaped projections 7 with a rounded region in the region of the tip of the cutters together with the discrete projections 7 illustrated in FIG. 8.

For the sake of completeness, it should be pointed out that the two clamping surfaces 5 of the bearing cover 3 may be of an identical design.

The embodiments illustrated as examples represent possible variants of the bearing cover 3, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

For the sake of good order, finally, it should be pointed out that, in order to provide a clearer understanding of the structure of the bearing cover 3, it and its constituent parts are illustrated to a certain extent out of scale and/or on an enlarged scale and/or on a reduced scale.

LIST OF REFERENCE NUMBERS

1 Bearing arrangement
2 Bearing block
3 Bearing cover
4 Friction bearing
5 Clamping surface
6 Co-operating clamping surface
7 Projection
8 Bore
9 Cross-section
10 Width
11 Height
12 Length
13 Base width
14 Angle of inclination
15 Side face
16 Radius
17 Cut-out
18 Side flank
19 Offset
20 Angle of inclination
21 Cut-out
22 Depth
23 Height
24 Width
25 Region
26 Region
27 Plateau
28 Flank
29 Flank

The invention claimed is:

1. A bearing cover for a split bearing arrangement which, in addition to the bearing cover, comprises a bearing block, and the bearing cover has a clamping surface, which lies against a co-operating clamping surface of the bearing block when the bearing arrangement is in the assembled state, and at least one projection is provided on the clamping surface and protruding out from it which can be pushed into the co-operating clamping surface of the bearing block, wherein the at least one projection has a cross-section which varies across its extension on the clamping surface, and wherein the at least one projection has a tapering cross-section in the direction of a width of the clamping surface.

2. The bearing cover as claimed in claim 1, wherein at least one of a width of the at least one projection and a height of the at least one projection varies across a length of the at least one projection.

3. The bearing cover as claimed in claim 1, wherein at least two projections are provided on each clamping surface, and the cross-sectional tapers extend in opposite directions.

4. The bearing cover as claimed in claim 1, wherein the at least one projection has a triangular cross-section.

5. The bearing cover as claimed in claim 1, wherein the at least one projection is of an at least partially rounded design.

6. The bearing cover as claimed in claim 5, wherein a rounded region has a radius selected from a range with a lower limit of 0.01 mm and an upper limit of 4 mm.

7. The bearing cover as claimed in claim 1, wherein at least one side face of the at least one projection extending in the direction of the width of the clamping surface has an angle of inclination towards the clamping surface selected from a range with a lower limit of 90° and an upper limit of 160°.

8. A bearing arrangement with a bearing cover and a bearing block lying against it, wherein the bearing cover is as claimed in claim 1.

9. A bearing cover for a split bearing arrangement which, in addition to the bearing cover, comprises a bearing block, and the bearing cover has a clamping surface which lies against a co-operating clamping surface of the bearing block when the bearing arrangement is in the assembled state, and at least one projection is provided on the clamping surface and protruding out from it which can be pushed into the co-operating clamping surface of the bearing block, wherein the at least one projection has a cross-section which varies across its extension on the clamping surface, and wherein the at least one projection is provided with an offset in the region of at least one of two side flanks.

10. The bearing cover as claimed in claim 9, wherein the offset forms a cut-out or recess in the side flank.

* * * * *